United States Patent [19]

Takahashi

[11] Patent Number: 5,085,545
[45] Date of Patent: Feb. 4, 1992

[54] EXPANSIBLE RIVET FOR SECURING TOGETHER OVERLAPPED PANELS

[75] Inventor: Atsushi Takahashi, Yokohama, Japan

[73] Assignee: Nifco Inc., Kanagawa, Japan

[21] Appl. No.: 561,373

[22] Filed: Jul. 31, 1990

Related U.S. Application Data

[63] Continuation of Ser. No. 870,165, Jun. 3, 1986, abandoned.

[30] Foreign Application Priority Data

Jun. 19, 1985 [JP] Japan .............................. 60-91501[U]

[51] Int. Cl.$^5$ ............................................. F16B 13/06
[52] U.S. Cl. ........................................ 411/45; 411/48; 411/49
[58] Field of Search ........................ 411/32, 33, 39, 40, 411/41, 42, 44, 45, 46, 49, 50, 51, 53, 56, 57, 60, 48, 508

[56] References Cited

U.S. PATENT DOCUMENTS

| | | | |
|---|---|---|---|
| 2,159,580 | 5/1939 | Zifferer | 411/51 |
| 3,105,407 | 10/1963 | Rapata | 411/41 |
| 3,147,525 | 9/1964 | Texier | 411/44 X |
| 3,188,905 | 6/1965 | Millet | 411/57 |
| 3,202,038 | 8/1965 | Bass | 411/57 |
| 3,205,759 | 9/1965 | Texier | 411/44 |
| 3,385,158 | 5/1968 | Morin | 411/45 |
| 4,216,697 | 8/1980 | Wilson | 411/39 X |
| 4,276,806 | 7/1981 | Morel | 411/46 X |
| 4,637,765 | 1/1987 | Omata | 411/41 |
| 4,840,523 | 6/1989 | Oshida | 411/908 X |
| 4,927,287 | 5/1990 | Ohkawa et al. | 411/510 X |
| 4,952,106 | 8/1990 | Kubogochi et al. | 411/508 X |

FOREIGN PATENT DOCUMENTS

| | | | |
|---|---|---|---|
| 248728 | 12/1963 | Australia | 411/46 |
| 2462604 | 3/1981 | Fed. Rep. of Germany | 411/57 |
| 44-7768 | 4/1969 | Japan | 411/41 |
| 48-13144 | 4/1973 | Japan | 411/45 |
| 55-120818 | 8/1980 | Japan . | |

*Primary Examiner*—Rodney M. Lindsey
*Attorney, Agent, or Firm*—Trexler, Bushnell, Giangiorgi & Blackstone, Ltd.

[57] ABSTRACT

An expansible rivet for securing together overlapped panels comprises a female member having a plurality of elastic legs defined by a corresponding number of axially elongate notches and a male member having a body portion having axially elongate fins slidably received in the axially elongate notches and a conical free end portion. The fins serve to permit stable coupling of the two members. The conical end portion facilitates the insertion of the male member into the female member.

5 Claims, 3 Drawing Sheets

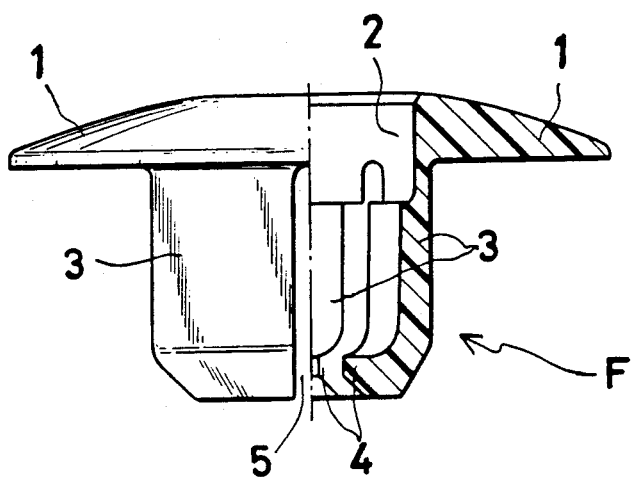
FIG_2
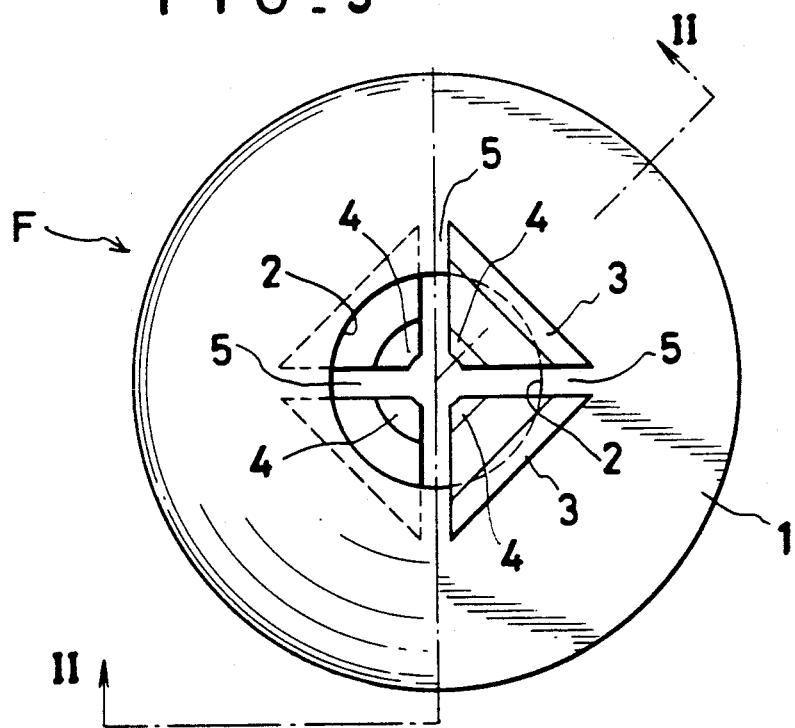
FIG_3

FIG_7
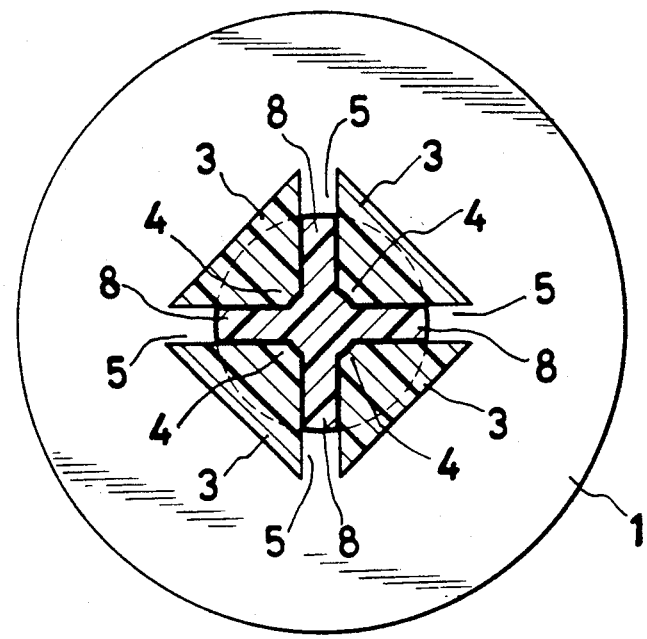
FIG_8
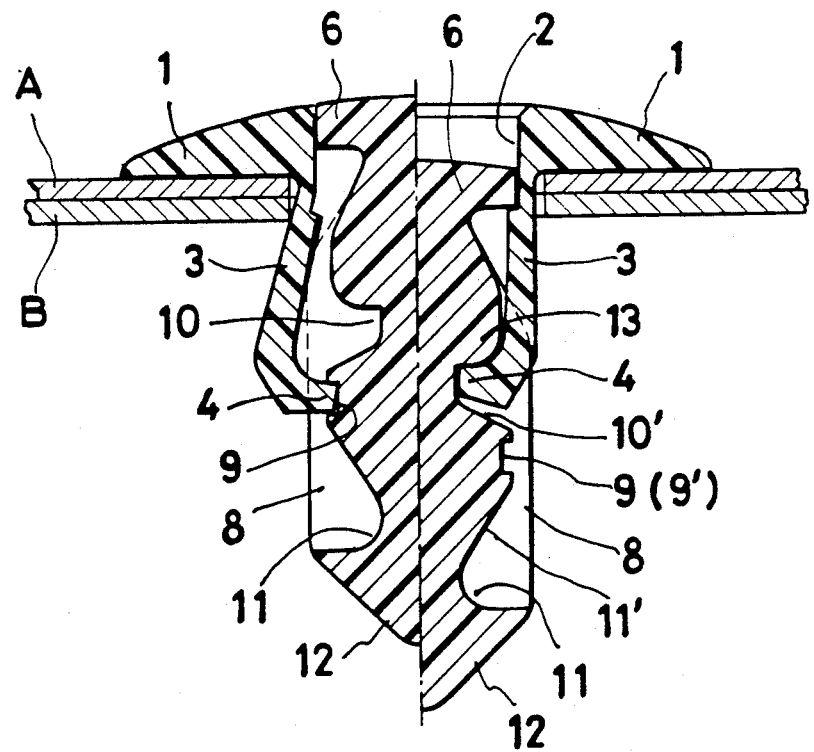

EXPANSIBLE RIVET FOR SECURING TOGETHER OVERLAPPED PANELS

This application is a continuation of application Ser. No. 06/870,165, filed June 3, 1986 now abandoned.

FIELD OF THE INVENTION AND RELATED ART STATEMENT

This invention relates to an expansible rivet for securing together various overlapped panels, which comprises a female member and a male member.

Among various rivets of the aforementioned type, there is known one, as shown in Japanese Patent Publication No. SHO 48-13144, in which a plurality of elastic legs projecting from the lower surface of a flange of the female member are inserted through aligned holes of a plurality of overlapped panels, then a body portion of the male member is pushed into a space defined by the elastic legs through a hole formed in the flange of the female member so as to secure together the overlapped panels with the elastic legs deformed radially outwardly when the top of the head at the top of the body portion of the male member becomes substantially flush with the top of the flange, and also in which the elastic legs restore to their initial state due to their elasticity to release the securement of the panels when the top of the head is made lower in level than the top of the flange by further pushing the male member.

The individual elastic legs each has a radially inward protuberance provided at the lower end. Also, the body portion of the male member has an axially intermediate raised portion and recessed portions formed thereover and thereunder, respectively, for receiving the protuberances. When securing together the overlapped panels, the elastic legs are deformed radially outwardly with the lower end inner protuberances thereof radially outwardly displaced by the raised portion as the body portion of the male member is pushed downwards. When the body portion is further pushed downwards, the elastic legs restore to the initial state with the protuberances received in the recessed portion over the raised portion.

With this prior art expansible rivet, the recessed portion provided under the raised portion of the male member is open toward the lower end of the body portion. Therefore, the two members can not be provisionally assembled together by inserting the male member into the female member. As a result, one of the members is liable to become separated from the other and lost during storage. Further, the female member can be freely rotated with respect to the male member when these members are in a state securing together panels or when they are in a released state obtained by further pushing the male member. Particularly, when a twisting force is exerted on the male member when they are in the state securing panels together, the lower end protuberances of the elastic legs are liable to be detached from the raised portion to release the securement. To prevent the accidental detachment of the protuberances from the raised portion, it is possible to increase the extent of the radially inward projection of the protuberances or increase the depth of a circumferential annular groove formed in the raised portion. In such a case, however, a large pushing force is required to insert the male member into the female member to secure together overlapped panels.

OBJECT AND SUMMARY OF THE INVENTION

An object of the invention is to provide an expansible rivet for securing together overlapped panels, which can be readily used to secure together overlapped panels by pushing the male member into the female member and can also be released from the state of securing the overlapped panels by further pushing the male member, and in which the male and female members are provisionally assembled together to facilitate storage and handling, and the stably coupled state of the male and female members can be maintained even in a released state which is obtained by further pushing the male member from a securement state in which the female and male members are locked together.

To attain the above object of the invention, there is provided an expansible rivet, in which the body portion of the male member includes a plurality of axially elongate fins extending radially from the axis so as to be slidably received in axially elongate notches between adjacent elastic legs, the raised portion and recessed portions thereover and thereunder being formed between adjacent ones of the fins, and the recessed portion under the raised portion terminating in a conical end portion having a pointed free end.

When the male member is pushed into the female member through a hole in a flange of the latter, outer portions of the fins constituting the body portion are slidably received in axially elongate notches between adjacent elastic legs. As the male member is pushed into the female member, the conical end portion of the body portion causes radially outward displacement of the protuberances of the elastic legs to cause radially outward flexing thereof. When the conical end portion clears the protuberances, they are received in the recessed portion under the raised portion, whereby the initial state of the elastic legs is restored.

The above and other objects and features of the invention will become more apparent from the detailed description with reference to the accompanying drawings.

BRIEF DESCRIPTION OF THE DRAWINGS

FIG 2 is a sectional view taken along line II—II in FIG. 3, showing a female member;

FIG. 3 is a top view, on the left half, and a bottom view, on the right half, showing the female member;

FIG. 7 is a sectional view taken along line VII—VII in FIG. 1; and

FIG. 8 is a sectional view, showing the embodiment in a securement state on the left half and in a released state on the right half.

DETAILED DESCRIPTION OF THE PREFERRED EMBODIMENT

Figure 1:
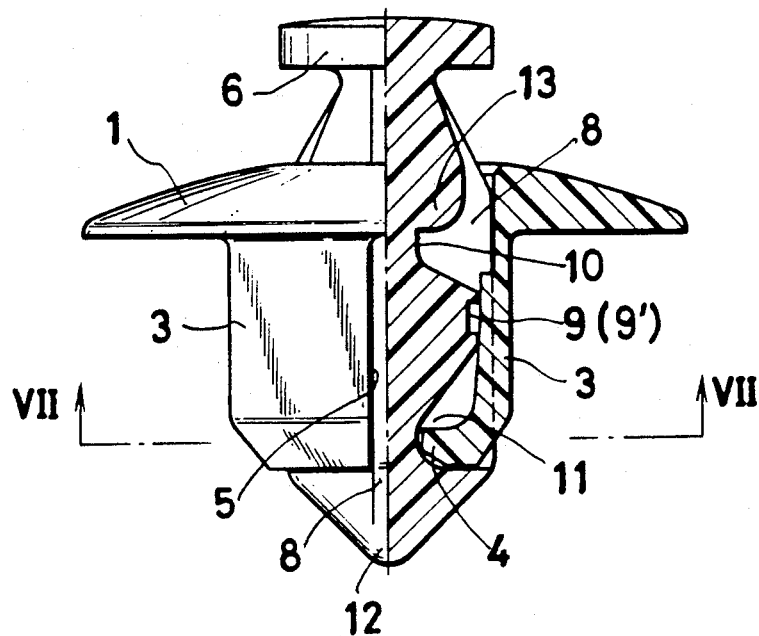
FIG. 1 is a front view, with one half in section, showing an embodiment of the expansible rivet according to the invention in an initial assembled state.
Figure 4:
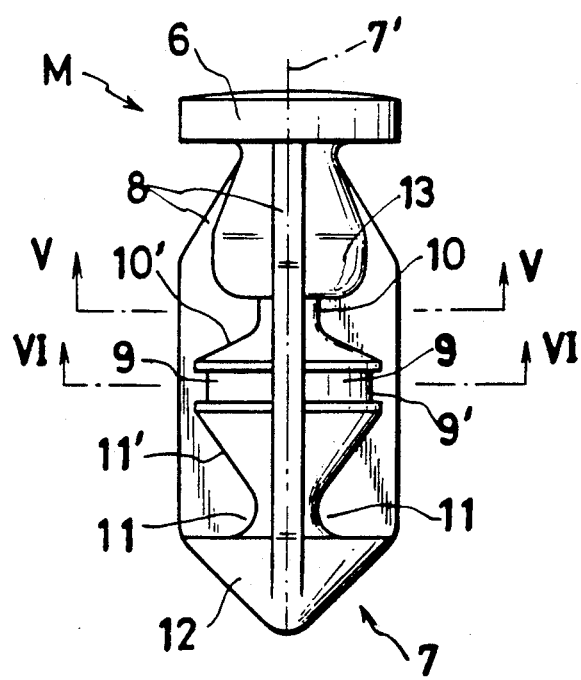
FIG. 4 is a front view showing a male member.
Figure 5:
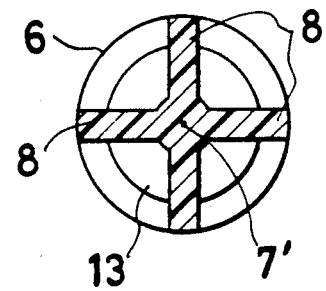
FIGS. 5 and 6 are sectional views taken along lines V—V and VI—VI in FIG. 4.
Figure 6:
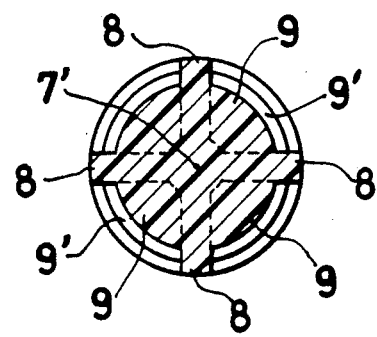

Referring to the Figures, there is shown an embodiment of the expansible rivet according to the invention. The expansible rivet comprises a female member F and a male member M. The female member F has a flange 1 with a hole 2 and a plurality of elastic legs 3 extending from the flange 1. The elastic legs 3 are formed by forming axially elongate notches 5. The elastic legs 3 each has a radially inward protuberance 4 provided at the free end, i.e. at the lower end. The male member M has a head 6 and a body portion 7 extending therefrom. Both the members F and M are made of a plastic material.

In this embodiment, the female member F has four elastic legs 3. Accordingly, the male member M has four fins 8. The elastic legs 3 and the fins 8 are radially uniformly spaced apart with respect to the axis 7'. The fins 8 have a thickness corresponding to the width of the axially elongate notches 5 between adjacent elastic legs 3. The fins 8 extend from the axis 7' to such an extent that they can be slidably received in the notches 5.

The body portion 7 of the male member M has a radially raised portion 9 and radially recessed portions 10 and 11. The portions 9 to 11 are formed between adjacent fins 8. The recessed portion 10 is formed between the raised portion 9 and a stem portion 13 terminating in the head 6. The recessed portion 11 is formed between the raised portion 9 and a conical end portion 12 having a pointed end. The protuberances 4 at the end of the elastic legs 3 of the female member F engage with the raised portion 9 of the male member M when the top of the head 6 is substantially flush with the top of the flange 1 of the female member F. Otherwise, the protuberances 4 are received in either recessed portion 10 or 11. In this embodiment, the large diameter upper end of the conical end portion 12 has a diameter substantially equal to the diameter of the head 6 or the hole 2 of the flange 1 of the female member F.

The female and male members F and M are assembled together by forcibly inserting the male member from the end portion 12 into the hole 2 of the flange 1 of the female member from above with the fins 8 aligned to the axially elongate notches 5. At this time, the outer portions of the fins 8 proceed along the notches 5. Also, the conical end portion 12 of the body portion 7 radially outwardly pushes the protuberances 4 of the elastic legs 3 to cause radially outward flexing of the elastic legs 3. Eventually, the end portion 12 clears the protuberances 4, whereupon the elastic legs 3 restore to their initial state with the protuberances 4 received in the recessed portion 11 under the raised portion 9 (FIG. 1).

In this state, the male member can no longer be withdrawn from the female member by pulling the former with respect to the latter because of the engagement of the protuberances 4 of the elastic legs 3 with the top of the conical end portion 12. That is, the male member is retained in the female member.

To secure together overlapped panels A and B with this rivet, the elastic legs 3 thereof are inserted through aligned holes of the panels until the lower surface of the flange 1 comes into engagement with the top surface of the upper panel, and then the male member is pushed into the female member. When the male member is pushed until the top of its head 6 is substantially flush with the top of the flange 1 of the female member, the elastic legs are radially outwardly flexed with the protuberances 4 thereof in engagement with and radially outwardly displaced by the raised portion 9. The panels A and B are thus urged against the lower surface of the flange 1 by the flexed elastic legs 3 and are thus secured together (left half of FIG. 8). As shown, the raised portion 9 may be formed with a circumferential annular groove 9' in order to prevent the protuberances 4 of the elastic legs 3 from being moved upwards or downwards and becoming detached from the raised portion 9 due to a slight applied force.

To release the panels from the secured state, the male member M is further pushed into the female member F. As a result, the protuberances 4 of the elastic members 3 are forced out of the raised portion 9 and into the recessed portion 10 thereabove. The elastic legs 3 thus restore to the initial state, as shown in the right half of FIG. 8.

To re-use the rivet after release of the panels A and B from securement, it is taken out of the holes of the panels, and the male member is pushed back with respect to the female member to restore the initial assembled state shown in FIG. 1.

To facilitate the operation of the rivet, i.e. of the male member M, from the initial assembled state shown in FIG. 1 to the securement state shown in the left half of FIG. 8, the recess 11 may be provided with an inclined surface 11', which serves as a cam surface, and along which the protuberances 4 of the elastic legs are moved.

Also, to facilitate the operation from the released state shown in the right half of FIG. 8 to the initial assembled state shown in FIG. 1, the recessed portion 10 may be provided with a similar inclined surface 10' serving as a cam surface, along which the protuberances 4 of the elastic legs are moved.

In order to prevent axial movement of the male member M in the released state shown in the right half of FIG. 8, the stem portion 13 above the recessed portion 10 may have a shape snugly fitting the inner surface of the elastic legs 3 between adjacent fins 8.

In the above embodiment, the four fins 8 are provided such that they extend to an equal extent from the axis to be slidably received in the axially elongate notches 5. However, to reduce the amount of resin material used, the structure may be such that only one fin or only a portion of the fins is slidably received in the notch or notches 5, while the rest of the fins extend to an extent insufficient to be received in any notch. Such an arrangement provides the same effects.

Further, it is possible to provide any desired number of fins 8.

As has been shown above, with the rivet according to the invention the male member can be preliminarily assembled and retained in the female member to eliminate the possibility of one of the two members getting lost. In addition, since the fins of the body portion of the male member are slidably received in the axially elongate notches between adjacent elastic legs of the female member, the two members cannot rotate with respect to each other in the securement state of the rivet, that is, the securement will not be released when a twisting force is applied to the rivet.

What is claimed is:

1. An expansible rivet for securing together overlapped panels comprising;
   a female member including a flange having a hole and a plurality of elastic legs extending from the lower surface of said flange surrounding said hole and defined by axially formed elongated notches, each of said elastic legs having a radially inward protuberance formed at a respective lower end; and
   a male member including a head having an outside diameter dimensioned to fit in the opening of said flange and a body portion extending from a lower surface of said head and capable of proceeding through said hole in said flange and a space surrounded by said plurality of elastic legs, said body portion having an intermediate raised portion of lesser diameter than said outside diameter of the head and recessed portions formed thereover and thereunder, the protuberances of said elastic legs engaging with said raised portion when a top of said head is substantially flush with a top of said flange and being received in one of said recessed portions otherwise;

said body portion of said male member including a plurality of axially elongate fins extending radially from the axis so as to be slidably received in the axially elongate notches between adjacent elastic legs, said raised portion and said recessed portions thereover and thereunder being formed between adjacent ones of said fins, said recessed portion under said raised portion terminating in a conical end portion having a pointed free end and having a diameter substantially equal to the diameter of said head and larger than said lesser diameter of said intermediate raised portion, said fins axially extending along said body portion of said male member including said recessed portion formed over and under said raised portion and radially extending to substantially the same diameter as the diameter of said conical end portion, said conical end portion supporting said protuberances of said elastic legs when said protuberances of said elastic legs are received in the lower recessed portion of the body portion.

2. The expansible rivet according to claim 1, wherein said female member has four elastic legs, and said male member has an equal number of fins.

3. The expansible rivet according to claim 1, wherein the largest diameter of said conical end portion of said male member is equal to the diameter of said hole in said flange of said female member.

4. The expansible rivet according to claim 1, wherein said elastic legs of the female member are four in number and arranged in a pattern having a square cross-sectional configuration.

5. The expansible rivet according to claim 1, wherein a part of the inside diameter of the space which is surrounded by said plurality of elastic legs and which communicates with the hole of said flange is substantially equal to the outside diameter of said head of said male member.

* * * * *